(12) United States Patent
Skog

(10) Patent No.: US 6,545,988 B1
(45) Date of Patent: Apr. 8, 2003

(54) METHOD AND DEVICE IN TELECOMMUNICATIONS NETWORK

(75) Inventor: Robert Skog, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/108,970

(22) Filed: Jul. 2, 1998

(30) Foreign Application Priority Data

Jul. 2, 1997 (SE) .............................................. 9702561

(51) Int. Cl.$^7$ ................................................. H04Q 7/00
(52) U.S. Cl. ...................................................... 370/329
(58) Field of Search ................................ 370/310, 328, 370/329, 330, 336, 337, 345, 347, 349, 352, 353, 355, 356; 455/433, 445, 450, 455, 518, 519

(56) References Cited

U.S. PATENT DOCUMENTS

| | | | | |
|---|---|---|---|---|
| 5,548,586 A | * | 8/1996 | Kito et al. ................... | 370/349 |
| 5,752,188 A | * | 5/1998 | Astrom et al. ............... | 455/433 |
| 5,781,860 A | * | 7/1998 | Lopponen et al. .......... | 455/426 |
| 6,009,088 A | * | 12/1999 | Taguchi et al. ............. | 370/338 |
| 6,061,341 A | * | 5/2000 | Andersson et al. ......... | 370/338 |
| 6,122,263 A | * | 9/2000 | Dahlin et al. ................ | 370/329 |

FOREIGN PATENT DOCUMENTS

| | | |
|---|---|---|
| AU | 36521/93 | 9/1997 |
| EP | 0 642 283 | 3/1995 |
| EP | 0 696 152 | 2/1996 |
| SE | 503 752 | 8/1995 |
| WO | 95/08900 | 3/1995 |

* cited by examiner

*Primary Examiner*—Kwang Bin Yao

(57) ABSTRACT

A method and apparatus for setting up a data communication connection to a mobile terminal (terminal B). The calling terminal (terminal A) sends a connection request to a connecting means in the mobile telecommunications network. The connecting means transmits a paging signal to terminal B. Terminal B responds by originating a call to terminal A so that a connection is set up through the network without passing the connecting means. The content information (e.g. voice data) between the two terminals is sent and received without the extra time delay associated with passing through the connecting means, which occurs when the content information must be sent via the connecting means. Also, the connecting means is used more efficiently, since it is not burdened with receiving, processing, and transmitting a relatively large amount of content information from the many connections established between terminals.

8 Claims, 4 Drawing Sheets

METHOD AND DEVICE IN TELECOMMUNICATIONS NETWORK

TECHNICAL FIELD

The present invention relates to data communication between two terminals connected to a data communication network, such as a TCP/IP network and more specifically to the establishment of connections between a first and a second terminal, when at least the second ti is a mobile terminal.

BACKGROUND

The term "mobile terminal" in this document is taken to mean any lad of terminal used for data communication, which is connected to a mobile telecommunications network, such as a GSM network. The terminal may be a mobile telephone, which is connectable to a computer, such as a personal computer, or a portable computer composing a telephone unit and/or a modem.

Establishing a connection for data communication between a fixed final in a data network, such as a TCP/IP network and a mobile terminal connected to the data network via a mobile telecommunications network, or between two mobile terminals via the data network, cannot be done in the conventional way, by calling the mobile terminal.

In order for a data communication connection to be established between two computers, the computer initiating the connection must know the address of the other computer. If one of the computers is a mobile terminal, the address of this computer is not known, since a mobile terminal may move around between different Mobile Switching Centres (MSCs) and/or Base Station Controllers (BSCs).

Also, the mobile terminal receiving the call, must be able to detect that the connection requested is a data connection and not an ordinary speech connection.

A solution for sending telefax or data to a mobile telephone is known, in which a telephone is identified by a number other than its ordinary telephone number when, for example, a telefax is to be sent to the telephone. The telephone then stores the incoming data, which may be forwarded to a fax machine to be printed as a telefax, or to a personal computer (PC) or the like.

The Swedish patent specification SE 503752 describes an apparatus for receiving electronic mail to a mobile telephone. An X.9 router is connected to a storage device for receiving and storing electronic mail combined with a Short Message Service (SMS) message and an agent comprising control information which will be recognized in a mobile telephone. The storage device is connected to a gateway, which is connected to a mobile telephone exchange via a router. The gateway forwards electronic messages to a mobile station unit, which routs them to the mobile telephone. The mobile telephone may be connected to a personal computer for transmission of data in both directions.

The above mentioned patent specification however only discloses a system in which SMS is used to send e-mail to a mobile user. Other types of data connections are not considered.

European Patent Application 0 696 152 A2 discloses a mobile communications system for transmission of speech and data between two mobile terminals. The calling subscriber connects to a bridge unit in the network, which in turn handles the establishment of the connection. Such a bridge unit is a rather complex unit, and it would be advantageous if connections of the specified kind could be handled without a bridge unit.

WO 9 508 900, A1, and EP 642 284, A2 describe solutions for. connecting through a data network to a mobile communication system by means of a connecting computer. In both these documents, a virtual connection to an agent has to be established before connecting to the data network. When information concerning the mobile terminal is to be transmitted, the agent requires the mobile terminal to connect again, by an SMS message.

SUMMARY OF THE INVENTION

It is an object of tie present invention to enable the establishment of a data communication connection from ally terminal connected to a data network, such as a TCP/IP network, to a mobile terminal connected to the data network through a mobile telecommunications network, without the need for additional units such as bridges, and without the need to establish a virtual connection in the network.

It is another object of the present invention to enable the establishment of an e-mail connection between terminals connected to the Internet, at least one of the terminals being a mobile terminal.

It is yet another object of the present invention to enable the establishment of a data communication connection from a mobile terminal connected to an IP network to another mobile terminal connected to an IP network.

These objects are achieved according to the invention by a method for establishing a connection between a first terminal connected to a data communication network and a second terminal connected via a mobile telecommunications network to the sane data communication network said method comprising the steps of:

sending a connect request from the first terminal to a node in the mobile telecommunications network;

sending a signal from the node requesting the second terminal to establish a connection to the first terminal;

initiating the connection between the second terminal and the first terminal, width the second terminal as the originator;

establishing the connection between the second teal and the first terminal.

The invention offers the following advantages:

It enables the establishment of a data communication connection from any terminal, including mobile terminals, to a mobile terminal.

Only one number is needed to the mobile terminal regardless of the type of connection wanted.

It enables the transfer of any kind and any amount of data.

A dialogue between two terminals exchanging text is possible.

It might be used as a notification medium, for example the mobile terminal could connect automatically to the e-mail server and retrieve incoming e-mail, when any.

DETAILED DESCRIPTION OF EMBODIMENTS

The teachings of the invention may be applied in any kind of data communication network which allows the connection of mobile terminals. Today such networks are usually based on the TCP/IP protocol. One such network, which is in common use today is the Internet. In this document, therefore, the network is referred to as the Internet for simplicity. This should not, however, be taken as a limitation of the scope of the invention.

Figure 1:
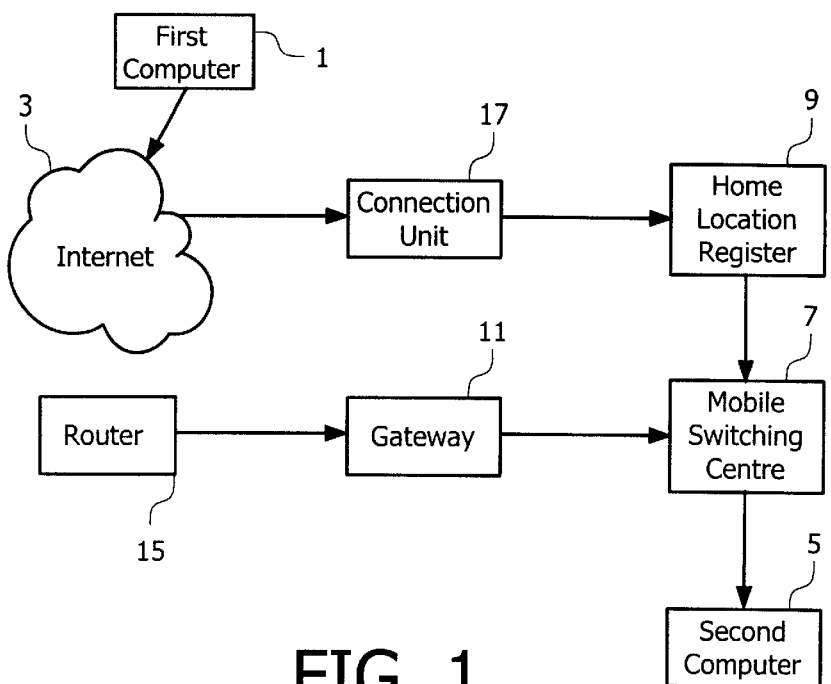
FIG. 1 shows schematically two computers connected to the Internet, one of which is a mobile terminal.

FIG. 1 shows a first computer 1 connected to the Internet 3. The connection may be made in any way known in the art for example through a modem or by a leased line.

A second computer 5, which is a mobile terminal, is connected to a Mobile Switching Centre (MSC) 7 via a Base Station System (BSS) (not shown). The MSC 7 handles the switching functions in the mobile network. A Visitor Location Register (VLR) is in this example implemented as part of the MSC but may as well be a separate unit connected to the MSC 7. The VLR holds information about all mobile terminals currently located in the service area of the corresponding MSC.

The mobile network comprises a Home Location Register (HLR) 9, comprising customer data about all subscribers in the network.

The MSC 7 is connected to a connection unit, or gateway, 11, which is the interface between the OSM network and other networks, In this example, the gateway is in turn connected to the Internet via a router 15. Other configurations are possible, as will be obvious to the skilled person.

The HLR 9 may be connected to the Internet 3 directly or via a connection unit 17. The connection unit 17 functions as a gateway between the data communication protocol used and the mobile telephony protocol used, and forwards address requests from the Internet to the HLR 9. The gateway functionality found in the connection unit may instead be integrated in the HLR.

Figure 2:
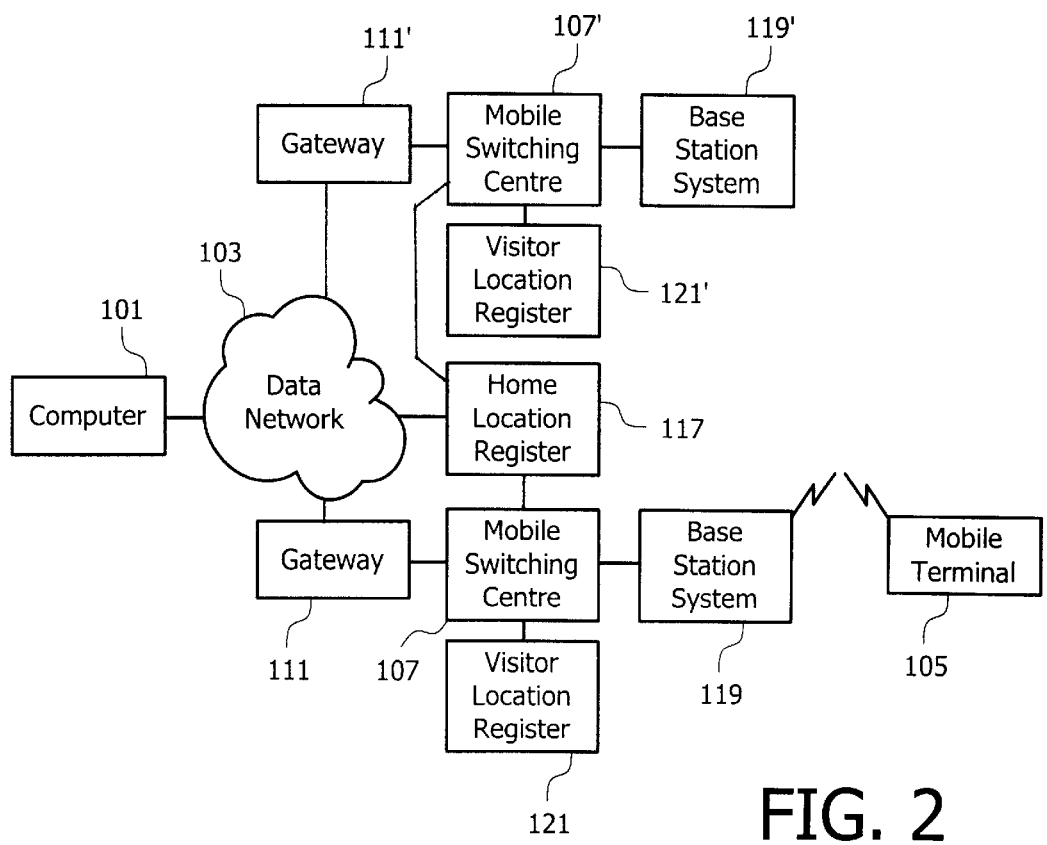
FIG. 2 shows the principles of roaming according to the invention.

FIG. 2 shows the situation when a computer 101 connected to a data network 103, such as the Internet, tries to reach a mobile terminal 105 in a mobile network connected to the data network 103. The mobile network comprises two MSCs 107, 107' and one HLR 117, as described in connection with FIG. 1, connected to rm MSCs 107, 107'. In this example, the HLR comprises the gateway functionality found in the connection unit 17 of FIG. 1. Each MSC 107, 107' is connected to the data network 103 through a gateway 111 and 111' respectively. The connection may also comprise other units, for example as shown in FIG. 1.

The mobile terminal 105 may be connected, via a BSSs 119, to one of the MSCs 107. Information about the mobile terminal is then stored in a VLR 121 connected to tile MSC 107. When the mobile terminal 105 roams into the service area of the other MSC 107', a VLR 121' connected to the other MSC 107' requests and stores data about the mobile terminal from the HLR 117.

Figure 3:
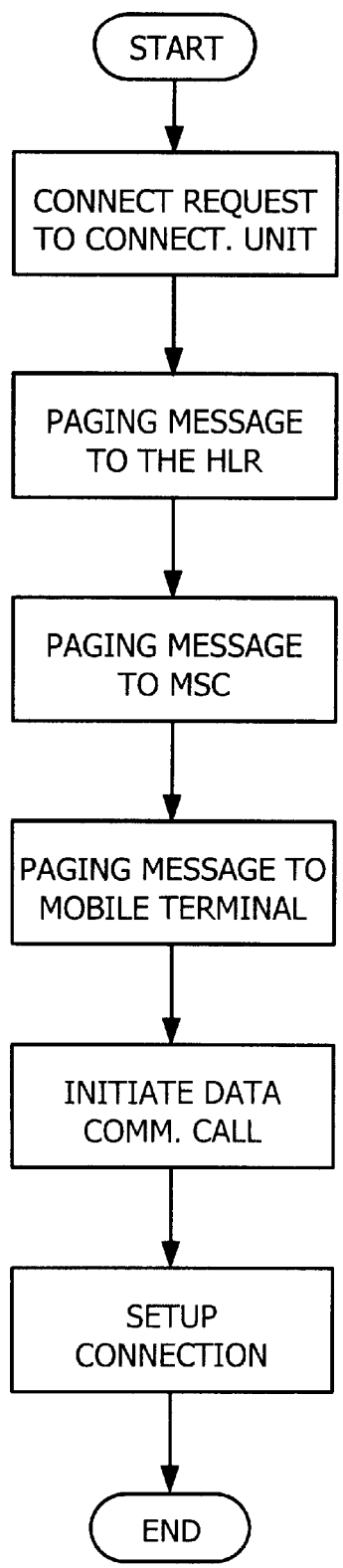
FIG. 3 is a flow chart of the actions taken when a connection is to be set up according to the invention.

FIG. 3 is a flow chart of the actions taken when the first computer 1 of FIG. 1 wants to establish a connection to the mobile terminal 5.

Step S31: A connect request is sent from the computer 1 to the connection unit 17.

Step S32: The connection unit 17 sends a paging message, intended for the mobile terminal 5, to the HLR 9. The data in the pang message is a code requesting the mobile terminal 5 to initiate a data communication call to the computer 1. The paging message comprises the address of the computer 1, to which the mobile terminal 5 is to connect.

Step S33; The HLR 9 sends the paging message to the MSC 7.

Step S34: The mobile terminal 5 receives the paging message and acts upon the data inside the message. For example, if the mobile terminal 5 is capable of receiving data, it may initiate a data connection to the computer 1 automatically. If the mobile terminal 5 is not capable of receiving data, for example, if it is a mobile telephone which is currently not connected to a computer, a message may be shown on the display unit of the mobile telephone that a data call has been received.

Step S35; The mobile terminal 5 initiates a data communication call, originated at the mobile terminal 5, using the host address found in the paging message, which is the address of the first computer 1. The call may be initiated automatically, if the appropriate software is present, or manually by the user.

Step S36: The connection is set up in the way common in the art for data communication between two terminals.

The two steps S31 and S32 could be replaced with one step, in which the connect request is sent directly to the HLR 9, depending on where the API for the connect request is implemented.

In the GSM system, the paging message may be transmitted according to the MAP USSD (USSD=Unstructured Supplementary Services Data) protocol or according to the GPRS protocols. The OPRS protocols are a set of protocols currently being developed to offer a routing path for packet transmission to a mobile terminal n a GSM network.

No special software is needed in the mobile terminal to receive the information comprised in the paging message and display it. Software that connects mobile terminals, such as telephones, to computers is also well known. The function to automatically connect to a computer to establish the connection, must be implemented as a software module in the mobile terminal, if desired.

If an error message (for example 'AbsentSubScriber') is received from the MAP USSD) request, then this error is returned as a result of the connect request. In this way, the first terminal is informed that it is not possible to make a data communication connection with the mobile terminal.

Figure 4:
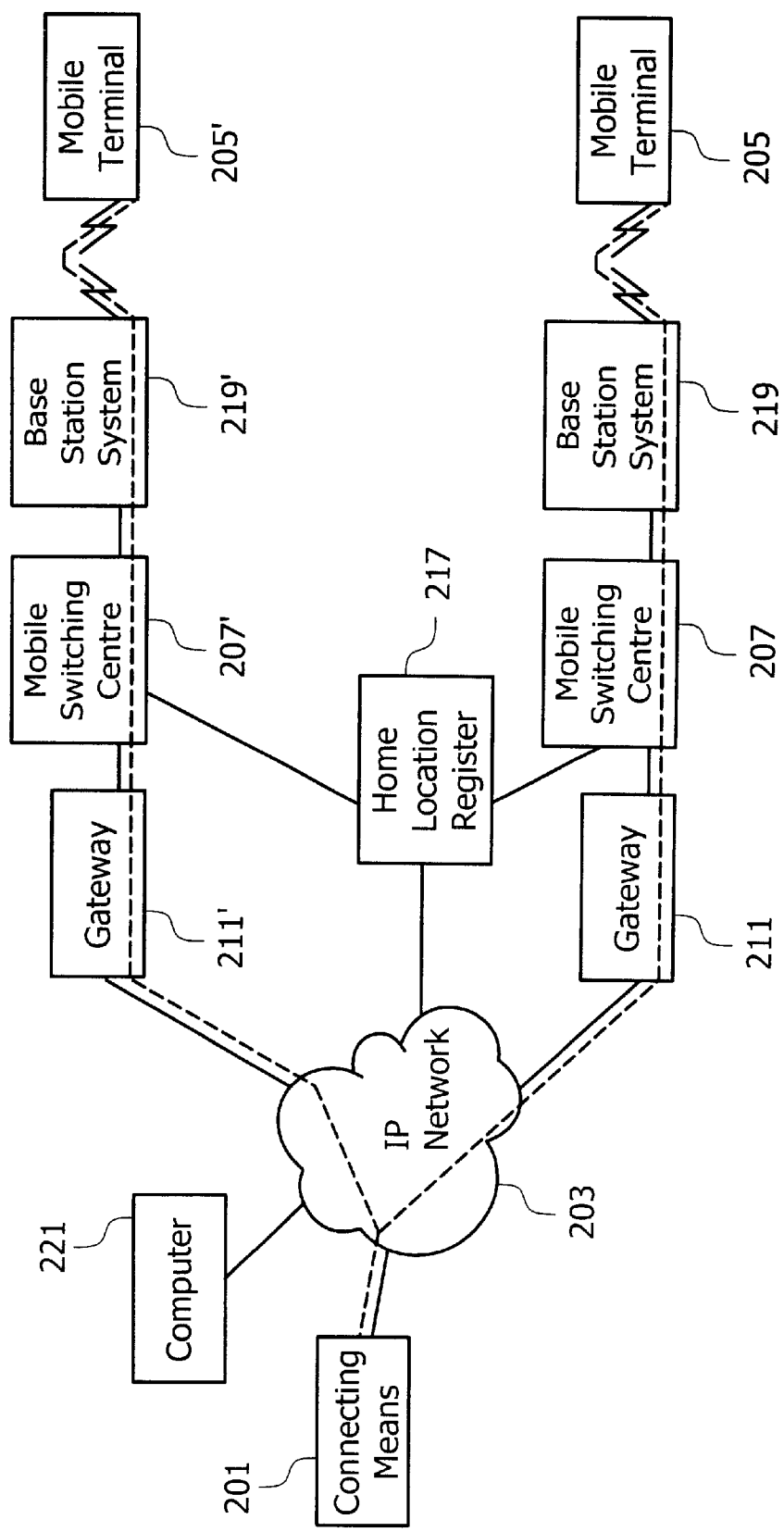
FIG. 4 shows the principles for establishing a connection between two mobile terminals via an rP network, according to the invention.

FIG. 4 shows the principles for the establishing a data communication connection between two mobile terminals, 205 and 205' respectively, through an IP network 203 by means of a connecting means 201'. In this example, the connecting means 201 is a personal computer (PC) comprising the functions needed to assist other units in the establishment of data connections, instead, the functions may be implemented in the BLR 217 or in the connection unit 17 shown in FIG. 1, as discussed in connection with FIG. 6.

The mobile terminals are connected to a mobile network in the same way as before. The network comprises two MSCs, 207 and 207' respectively, each of which is connected to the IP network through a gateway, 211 and 211' respectively. As in FIG. 1, the VLR functionality is implemented as part of the MSCs 207, 207'. A BSS, 219, 219' is connected to each MSC, 207 and 207' respectively. The BSSs 219,219' provide the connections to the mobile terminals 205 and 205', respectively.

If one mobile terminal 205 cMs the other mobile tezzinal 205', an ordinary speech connection will be set up. A connection for data communication may be set up according to the procedure shown in FIG. 5. The resulting connection is shown by the dashed line in FIG. 4. A computer 221, which is not itself able to establish data connections according to the invention, may use the connecting means 201 to establish such connections, in the same way.

Figure 5:
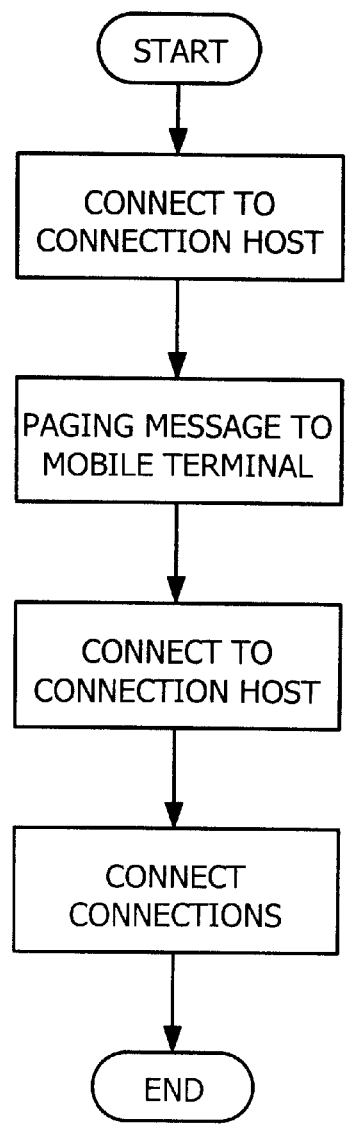
FIG. 5 is a flow chart of the actions taken when a connection is to be set up between two mobile units through a connecting means, according to the invention.

FIG. 5 shows the actions to be taken when establishing a data connection between a first 205 and a second 205' mobile terminal through a connecting means 201.

Step S51: The first mobile terminal 205 establishes a connection to the connecting means 201.
Step S52: The connecting means 201 sends out a paging message via the HLR 217 to the second mobile terminal 205'. The paging message comprises the address of the connecting means 201.
Step S53: The second mobile terminal 205' connects to the connecting means 201, automatically or through actions performed by the user.
Step S54. The connection from the first mobile terminal 205 to the connecting means 201, and the connection from the second mobile terminal 205' to the connecting means 201, are connected to establish a connection between the first 205 and the second 205' mobile terminal.

The same procedure may be used for a first terminal that is not a mobile terminal as well It will be obvious to the sided person how to implement this.

Figure 6:
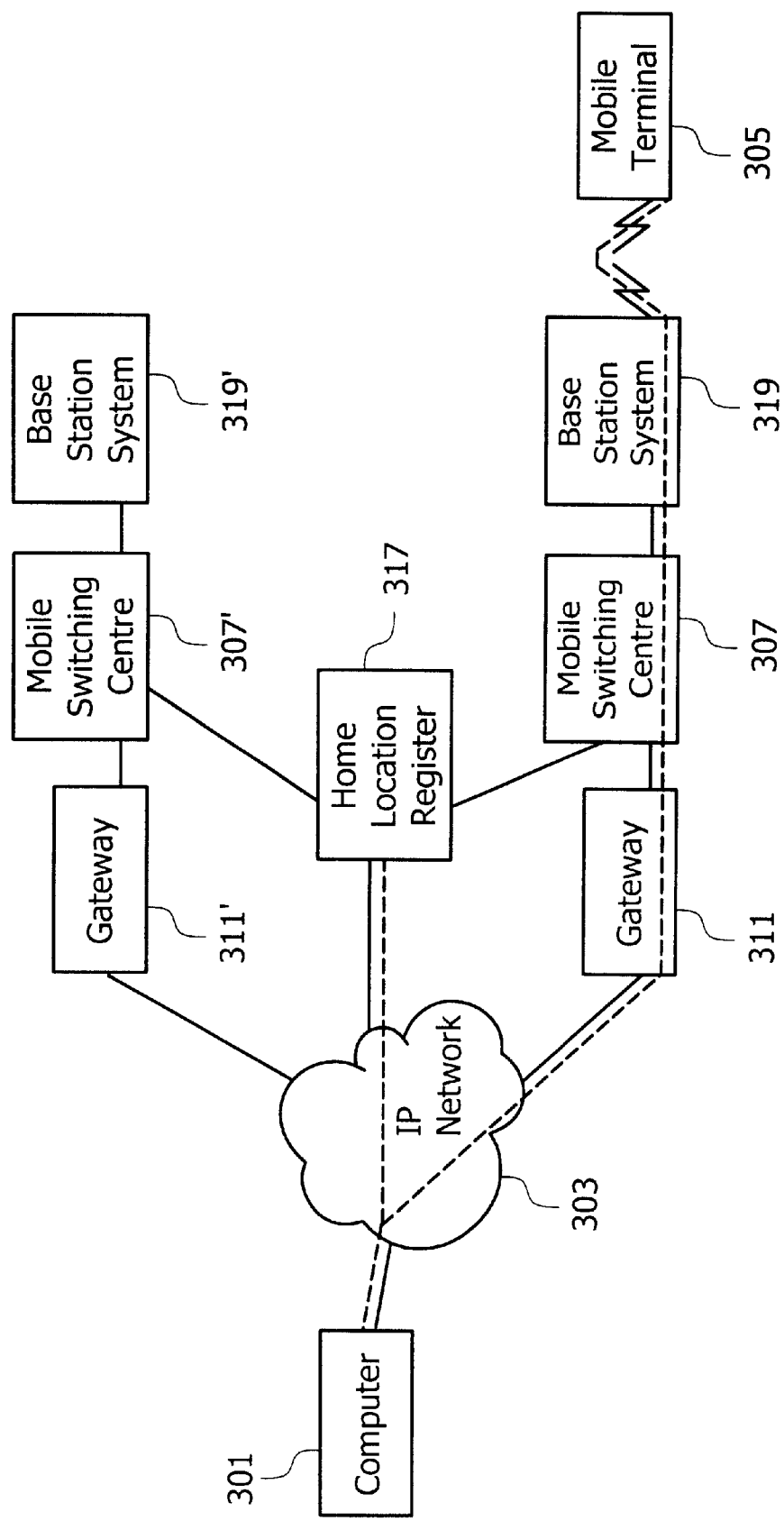
FIG. 6 shows the principle for establishing a connection between a first and a mobile second terminal through a connecting means, according to the invention.

FIG. 6 shows, as a dashed line, a connection between a computer 301 connected to the IP network 303, and a mobile terminal 305, according to the invention. The mobile network comprises MSCs 307, 307' each connected to the IP network though a gateway, 311, 311' respectively, and an HLR317. BSSs 319,319' provide the connections to the mobile terminals 305. The connecting means functionality is implemented in the HLR 317, which therefore takes part in the connection If the connecting means functionality is implemented in a separate node, such as the connection unit 17 in FIG. 1, the connecting means functionality could also he implemented in the connection unit.

The computer 301 may be any computer that has an address in the data network, that is, a mobile terminal could be used in this way, provided it was temporarily logged on to the data network and thus had a temporary address in the data network, such as an IP address in a TCP/IP network.

The above discussion is, to some extent, based on the GSM protocols. It should be obvious to the skilled person how to implement the teachings of the invention in other types of mobile telecommunications networks. The invention is therefore not limited to GSM networks.

What is claimed is:

1. A method for establishing a connection between a first terminal connected to a data communication network and a second terminal connected via a mobile telecommunications network, to the same data communication network, comprising the steps of:
    sending a connect request from the first terminal to a node in the mobile telecommunications network;
    sending a paging message from the node requesting the second terminal to establish a connection to the first terminal;
    initiating, upon receipt of the paging message at the second terminal, the connection between the second terminal and the first terminal by forwarding a data call to the first terminal by the second terminal; and
    establishing the connection between the second terminal and the first terminal via data communication between the first and second terminals, the node not participating in the data communication or the data call.

2. The method according to claim 1, wherein the data communication network is a TCP/IP network in which a number of subnetworks are connected to form one overall network, such as the Internet.

3. The method according to claim 1, wherein MAP USSD signalling according to the GSM protocol is used for the paging message.

4. The method according to claim 1, wherein GPRS protocols are used for the paging message.

5. The method according to claim 1, wherein the paging message comprises the address of the first terminal.

6. A method for establishing a connection between a first terminal in a data communication network and a mobile, second terminal, connected via a mobile network to the same data communication network, said data communication network comprising or being connected to a connecting means, the method comprising the steps of:
    establishing a connection from the first terminal to the connecting means by forwarding a first data call to the connecting means by the first terminal;
    sending a paging message from the connecting means requesting the mobile second terminal to establish a connection to the connecting means;
    initiating, upon receipt of the paging message at the second terminal, the connection between the second terminal and the connecting means by forwarding a second data call to the connecting means by the second terminal; and
    establishing the connection between the second terminal and the first terminal without requiring continued support by the connecting means for the connection.

7. The method according to claim 6, wherein the connecting means is a computer connected to the data network, and the connection between the first and the second terminal is set up through the connecting means.

8. The method according to claim 6, wherein the first terminal is also a mobile terminal connected to the data network through a mobile telecommunications network.

* * * * *